US007045201B2

United States Patent
Corvasce et al.

(10) Patent No.: US 7,045,201 B2
(45) Date of Patent: May 16, 2006

(54) STARCH-MODIFIED AQUEOUS ADHESIVE DIP, TREATED YARNS THEREWITH AND TIRE HAVING COMPONENT OF RUBBER COMPOSITION CONTAINING SUCH TREATED YARNS

(75) Inventors: Filomeno Gennaro Corvasce, Mertzig (LU); Serge Julien Auguste Imhoff, Schrondweiler (LU); Rene Francois Reuter, Burden (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 239 days.

(21) Appl. No.: 10/437,624

(22) Filed: May 14, 2003

(65) Prior Publication Data

US 2003/0232915 A1    Dec. 18, 2003

Related U.S. Application Data

(60) Provisional application No. 60/389,006, filed on Jun. 14, 2002.

(51) Int. Cl.
    *B32B 25/10* (2006.01)

(52) U.S. Cl. .................. 428/296.4; 428/364; 524/47

(58) Field of Classification Search ................. 524/47; 428/296.4, 364
    See application file for complete search history.

(56) References Cited

U.S. PATENT DOCUMENTS

| | | | |
|---|---|---|---|
| 2,128,635 A | 8/1938 | Charch et al. ............. 154/40 |
| RE23,451 E | 1/1952 | Mighton .................. 154/43 |
| 3,194,294 A | 7/1965 | van Gils .................. 152/330 |
| 3,301,804 A | 1/1967 | Zora et al. ............... 260/29.2 |
| 3,437,122 A | 4/1969 | van Gils .................. 152/330 |
| 3,749,758 A | 7/1973 | Gannon .................... 260/835 |
| 3,946,132 A | 3/1976 | Hedden ................... 428/378 |
| 4,031,288 A | 6/1977 | Bhakuni et al. ........... 428/395 |
| 4,132,693 A | 1/1979 | Bhakuni et al. ........... 260/29.3 |
| 4,356,219 A | 10/1982 | Boon et al. .............. 427/386 |
| 4,439,556 A | 3/1984 | Girgis .................... 523/206 |
| 4,472,463 A | 9/1984 | Solomon .................. 427/381 |
| 4,572,863 A | 2/1986 | Chung .................... 428/250 |
| 5,672,639 A | 9/1997 | Corvasce et al. .......... 524/52 |
| 5,762,639 A | 6/1998 | Gibbs .................... 604/272 |
| 5,969,211 A | 10/1999 | Burns et al. ............. 800/23 |
| 6,202,726 B1 * | 3/2001 | Corvasce et al. .......... 152/517 |

FOREIGN PATENT DOCUMENTS

| | | |
|---|---|---|
| EP | 795581 | 9/1997 |
| EP | 892007 | 1/1999 |

OTHER PUBLICATIONS

XP002256990 Abstract for Japanese Patent 11 315476 A as published by Derwent Publications Ltd., London, GB, the week of Jul., 2000.
EPO Search Report.

* cited by examiner

*Primary Examiner*—Peter D. Mulcahy
(74) *Attorney, Agent, or Firm*—Henry C. Young, Jr.

(57) ABSTRACT

The invention relates to treatment of yarns for use in reinforcement of rubber products. Such treatment comprises application to the yarn of an aqueous emulsion of polyester and/or epoxy adhesive, or an aqueous alkaline dispersion of rubber latex and resorcinol-formaldehyde resin adhesive, wherein said adhesive contains a minor amount of particulate, water insoluble starch composite of starch and water insoluble plasticizer therefor. Such yarns may be in a form of a cord comprised of a plurality of yarns. The invention further relates to such treated yarns. The invention additionally relates to such treated yarns and a composite of rubber and said treated yarns. The invention additionally relates to an article of manufacture such, as for example, a rubber tire, having at least one component comprised of said composite.

10 Claims, No Drawings

STARCH-MODIFIED AQUEOUS ADHESIVE DIP, TREATED YARNS THEREWITH AND TIRE HAVING COMPONENT OF RUBBER COMPOSITION CONTAINING SUCH TREATED YARNS

The Applicants hereby incorporate by reference prior U.S. Provisional Application Ser. No. 60/389,006, filed on Jun. 14, 2002.

FIELD OF THE INVENTION

The invention relates to treatment of yarns for use in reinforcement of rubber products. Such treatment comprises application to the yarn of an aqueous emulsion of polyester and/or epoxy adhesive, or an aqueous alkaline dispersion of rubber latex and resorcinol-formaldehyde resin adhesive, wherein said adhesive contains a minor amount of particulate, water insoluble starch composite of starch and water insoluble plasticizer therefor. Such yarns may be in a form of a cord comprised of a plurality of yarns. The invention further relates to such treated yarns. The invention additionally relates to such treated yarns and a composite of rubber and said treated yarns. The invention additionally relates to an article of manufacture such, as for example, a rubber tire, having at least one component comprised of said composite.

BACKGROUND OF THE INVENTION

Composites of fiber-reinforced rubber are useful for many purposes including articles of manufacture such as tires and industrial products which contain at least one component comprised of a composite of fiber-reinforced rubber. Typically such fibers are in a form of a cord comprised of cabled, or twisted, yarns. Such fibers can be of various materials including, for example, nylon, aramid, polyester, carbon, polyvinyl alcohol, steel wire including brass coated steel wire, rayon, cotton and glass.

An important requirement of such reinforced rubber composites is the adhesion of the reinforcing fiber, or cord thereof, to the rubber itself. Such adhesion is of particular importance where the resulting rubber composite is intended to be subjected to considerable flexing and distortion, such as for example may be experienced in a typical operation and use of tires, particularly pneumatic tires, and industrial power transmission and conveying rubber belts.

The invention relates to treating yarn, which may be in a form of a cord comprised of a plurality yarns, to rubber compositions which contain such treated yarn and to articles of manufacture, including tires, which contain at least one component comprised of such rubber composition.

Various methods have been historically used to obtain adhesion of fiber and cords thereof to rubber compositions which involve pre-treating the cord with an adhesive.

For example, the cord has been pretreated prior to adhering to rubber by dipping, followed by drying, in an aqueous emulsion (dispersion) comprised of a rubber latex which contains a resorcinol/formaldehyde resin (RFL) which is a treatment well known to those having skill in such art. Such rubber for said latex is typically a butadiene/styrene/vinylpyridine terpolymer. The resorcinol/formaldehyde resin is understood to be a primary element of the adhesive between the cord and the rubber with the latex being useful in reducing the modulus of the resin. Other advantages and features of the RFL for adhering cord to rubber are generally well known to those having skill in such art.

Sometimes, particularly for polyester cords, a single dip or a double dip adhesive system might be used to coat the cord with an adhesive layer.

In the double dip system, cord (e.g. cord of a plurality of twisted polyester yarns) is treated with a first dip such as a dispersion of a phenol-blocked diisocyanate, particularly a phenol-blocked diphenylmethane diisocyanate, an epoxy resin, wetting agents and water. The treated cord is cured (e.g. the coating on the cord is cured), then treated with a second dip of latex which contains a resorcinol/formaldehyde resin and cured again (e.g. the second coating on the cord is cured). In the single dip system, the adhesive coating is typically applied to a yarn (e.g. polyester yarn) during the drawing of the yarn or after a drawing of the yarn in a separate operation. The yarn is plied, or twisted, to form cords thereof which are treated with a latex which contains a resorcinol/formaldehyde resin and cured (e.g. the coating on the cord is cured). The need for the aforesaid diisocyanate dip in cord processing is not used by such single dip system.

U.S. Pat. No. 4,356,219 relates to use of an adhesive dip for reinforcing fabrics which contains an antidegradant. U.S. Pat. No. 4,472,463 relates to use of a second dip for coating cord or fabric made of polyester, where the dip is an aqueous emulsion containing an adhesive latex of a diene polymer and an acrylic resin. U.S. Pat. No. 3,749,758 relates to compositions containing polyesters and polyepoxides. U.S. Pat. No. 3,301,804 relates to tire yarns treated with an aqueous emulsion of an epoxy novalac and amino boron catalyst. U.S. Pat. No. 2,128,635 relates to application to a fabric of polyhydric phenol-aldehyde condensation products and latices. Blends of vinylpyridine/diene hydrocarbon resins, with rubber latices, have been suggested in U.S. Pat. No. Re. 23,451 for use for nylon cord.

The weaving, dipping, heat setting, and calendering of treated cord reinforcement for rubber compositions is explained in the *Kirk Othmer Encyclopedia of Chemical Technology*, end ed., Volume 20, Page 334, which is incorporated herein by reference into this specification. It is seen that adhesive formulations are only one part of the complex technology of fabric (cord) processing.

For example, latex based resorcinol-formaldehyde resin compositions for adhering various cords to rubber have been used for many years. They are the subject of many patent publications which involve, for example, variations in latices, variations in resin compositions and various additives to aid, for example, in resisting degradation to heat, to enhance stronger bonds and other beneficial effects.

Resins components as polyhydroxy and dihydroxy phenols have been reported for use in a dip at least as early as the aforesaid U.S. Pat. No. 2,128,635 for use in bonding cords (fabric) to rubber.

Blends of vinylpyridine/diene hydrocarbon latices with polyhydric phenol-aldehyde converted resols have been described, for example in the aforesaid U.S. Pat. No. Re. 23,451 which relates to adhesives for use with nylon cord.

An improvement on vinylpyridine/diene type adhesives is addressed in U.S. Pat. No. 3,194,294.

Use of polyhydric phenolic resins are also addressed, for example, in U.S. Pat. No. 3,437,122 and Canadian patent No. 984,076.

See also U.S. Pat. Nos. 4,572,863, 4,132,693 and 4,031,288.

Starch, particularly starch/plasticizer composites, have been suggested for use in elastomer formulations for various purposes, including for various tire components. For example see U.S. Pat. Nos. 5,969,211 and 5,672,639 which are incorporated by reference herein in their entirety.

For this invention, a pre-formed composite comprised of starch and water insoluble plasticizer therefor is contemplated to enable such plasticizer to have a plasticizing effect on the starch in order to reduce the softening point of the starch. For the purposes of this invention, water insoluble insofar as the plasticizer for the starch composite is concerned means a material which is not readily water soluble absent a significant increase in temperature or absent the presence of a material, other than the starch, which will render the plasticizer material soluble in water.

In the description of this invention, the term "phr" where used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition","compounded rubber" and "rubber compound",if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, an aqueous coating composition (for use in coating one or more yarns for reinforcing rubber compositions) is provided which is comprised of:

(A) an aqueous dispersion comprised of
  (1) an aqueous latex of elastomer particles, and
  (2) a resorcinol/formaldehyde resin in a weight ratio of said resin to said elastomer particles in a range of from about 10/90 to about 70/30, or (B) an aqueous dispersion comprised of
  (1) phenolic hindered, or blocked, diisocyanate selected as, for example a phenolic hendered diisocyanate such as, for example a diphenylmethane diisocyanate blocked by a resorcinol-formaldehyde-precondensate, and
  (2) and epoxy as ortho-cresol formaldehyde resin in a weight ratio of said resin to said hindered diisocyanate in a range of from about 5/1 to about 10/1, and (C) particulate water insoluble, pre-formed, composite of starch and water insoluble plasticizer therefor, wherein the weight ratio of starch to plasticizer is in a range of about 1.5/1 to about 9/1 and the weight ratio of starch to said elastomer particles in said latex and said resorcinol/formaldehyde resin is about 10/90 to about 25/75 and the weight ratio of starch to said phenolic hindered diisocyanate and associated resin is in a range of about 30/70 to about 55/45; wherein said starch is composed of amylose units and amylopectin units and has a softening point in a range of about 180° C. to about 220° C.; wherein said starch/plasticizer composite has a softening point in a range of about 110° C. to about 170° C. and where the plasticizer is a polymeric plasticizer having a softening point of less than 160° C.; wherein said softening points are determined according to ASTM No. D1228;

wherein said elastomer particles of said latex are comprised of at least one of vinylpyridine/diene terpolymers such as, for example, styrene/butadiene/vinylpyridine terpolymers and butadiene/vinylpyridine copolymers, natural cis 1,4-polyisoprene rubber, chloroprene rubber, acrylonitrile/butadiene copolymer rubber, cis 1,4-polybutadiene rubber, ethylene/propylene/diene terpolymer rubber and styrene/butadiene rubber (SBR), and their mixtures, preferably vinylpyridine/diene terpolymers, namely styrene/butadiene/vinylpyridine terpolymers.

In further accordance with this invention, a coating composition (for use in coating one or more yarns for reinforcement of rubber compositions) is prepared by the steps comprised of (A) dissolving resorcinol in water in a suitable container to form an aqueous resorcinol solution (B) adding an aqueous formaldehyde solution to said resorcinol solution to form a solution containing said resorcinol and formaldehyde of a weight ratio in a range of about 1.5/1 to about 2.5/1.

(C) adding a base selected from sodium hydroxide, ammonium hydroxide and/or potassium hydroxide (preferably sodium hydroxide) slowly to said aqueous solution of resorcinol and formaldehyde to form an aqueous mixture thereof, (D) adding said particulate pre-formed composite of starch and water insoluble plasticizer therefor to said mixture, (E) adding said aqueous latex of elastomer particles (e.g. styrene/butadiene/vinylpyridiene terpolymer) to said starch composite-containing mixture.

In further accordance with this invention, a coated cord comprised of at least one fiber, and typically a plurality of twisted fibers, or yarns, selected from at least one of nylon, aramid, polyester, carbon, steel wire and particularly brass coated steel wire, rayon and glass fibers coated with said coating composition of this invention is provided.

In practice, said yarn(s) is coated with said coating composition and heat treated by heating said coated yarn(s) to a temperature in a range of from about 175° C. to about 250° C., usually for a period of time in a range of from 30 to about 80 seconds, depending somewhat upon the combination of selected fiber, or yarn, and selected coating composition as well as associated cord (composed of one or more yarns) adhesion properties desired.

In additional accordance with this invention, a cord reinforced diene-based rubber composition is provided comprised of at least one diene-based elastomer and at least one of said coated cords.

In further accordance with this invention an article of manufacture is provided having at least one component comprised of said cord reinforced diene-based rubber composition.

In additional accordance with this invention, a rubber tire is provided having at least one component comprised of said cord reinforced diene-based rubber composition.

In further accordance with this invention, said component of said tire is, for example, at least one of a carcass ply, said carcass ply composed of rubber encapsulated cords typically extending from bead-to-bead, circumferential belt ply extending circumferentially around the tire carcass and positioned between the circumferential tire tread and tire carcass, a fabric reinforced component such as, for example, a chafer or a flipper/chipper, particularly a tire carcass ply.

The term "ply" is used herein in its conventional sense as a plurality of cords encapsulated by an elastomer, or an elastomer which contains a plurality of cords as reinforcement for the elastomer. Such plies are often prepared by calendering the rubber onto the plurality of cords by a calendering machine. The terms "ply" and "calendering" for preparation of cord reinforced plies are well known to those having skill in such art.

Significant aspects of this invention are both order of addition of the starch composite, a requirement that the starch composite is used in a minor amount, or proportion, of the solids portion of the coating composition (e,g, exclusive of the water portion of the coating composition) and that the plasticizer of the starch composite is relatively water insoluble. While the ratios of the ingredients can vary considerably, the amount of starch composite component is desirably limited to a maximum of about 10 weight percent of the solids portion of the coating composition (e.g. exclusive of the water portion of the coating composition), depending upon factors such as, for example, choice of latex, the cord intended to be coated, and the end product.

While formaldehyde is a preferred aldehyde and the one most commonly used, other aldehydes might be used which are water soluble, such as, for example, acetaldehyde, furfural, propionaldehyde and crotonaldehyde.

When sodium hydroxide is used as a base to promote (e.g. catalyze) the resinification reaction between the resorcinol and formaldehyde, the mole ratio of sodium hydroxide to resorcinol is, for example, generally in a range of from about 0.5/1 to about 0.4/1.

The process of resinification (resin preparation) is generally carried out at atmospheric pressure and room temperature (e.g. at about 20° C. to about 25° C.), although a cooling means might be employed to remove heat of the resinification reaction.

The latex is conventionally selected for properties desired to be imparted to the cord and to the final product. For example, as previously discussed, vinylpyridine/diene terpolymers and copolymers might be used such as, for example, styrene/butadiene/alpha-vinylpyridine terpolymers and butadiene/alpha-vinylpyridine copolymers, are often used for their adhesive imparting properties. The term "vinyl pyridine" is intended to encompass alpha, beta, and gamma vinylpyridines and their homologues as mentioned in U.S. Pat. No. Re 23,451, Column 12, Lines 19 through 27. Other latices which might be used are, for example, latices comprised of natural cis 1,4-polyisoprene rubber, chloroprene rubber, acrylonitrile/butadiene copolymer rubber, cis 1,4-polybutadiene rubber, ethylene/propylene/diene terpolymer rubber, styrene/butadiene rubber (SBR) and chlorosulfonated polyethylene. Often, the latex may be chosen to be compatible with the rubber which will later be applied to the reinforcing cord, for example, an SBR based latex for a rubber composition comprised of SBR. Also blends of various latices may be used and the term "latex" as used herein is intended to include blends of latices. The dry weight of latex solids (the polymer, or rubber, contained in such latex) to resin may range, for example, from about 14.1 to about 1.9 and more usually from 12/1 to about 1.1.

It is to be appreciated that this invention has modified a normal process of preparing an aqueous adhesive dip for a cord by inclusion of the starch/plasticizer composite (the starch being a renewable natural-source material).

This aspect of this invention is considered herein to be significant through the use of said starch component in the fiber coating composition which is seen herein to open new rubber composition compounding techniques through, for example, use of surface chemistry of the starch composite in the coating in combination with an organosilane and/or silane-polysulfide coupling agent, to further enhance the adhesion of the coating to the fiber and, also, to enhance the adhesion of the coated fiber to its associated rubber composition which it reinforces.

For the starch composite, it is to be appreciated that starch has previously been suggested for use in rubber products, including starch/plasticizer composites. For example, see heretofore referenced U.S. Pat. No. 5,762,639.

The water insoluble plasticizer of the starch/plasticizer composite may contain hydrophilic groups intercaled with hydrophobic sequences in which the hydrophilicity properties are balanced in a manner such that the resulting compositions can provide a complete insolubilization of the starch in water.

For example, ethylene/vinyl alcohol copolymer may be suitable as a water insoluble plasticizer to prepare said starch composite having a vinyl alcohol content, which is preferably greater than 50 mole percent, of a maximum of 90 mole percent and preferably a maximum of 80 mole percent (thus in a range of from 50 to 90, or from 50 to 80, mole percent of the copolymer). While it is considered that such resulting starch composite is suitably water insoluble for the purposes of this invention, it is contemplated that if the starch composite is contained in boiling water, a formation of layers would be expected to occur instead of micro-dispersions so that to as an "esterification condensation reaction". Such esterification reactions are well known to those skilled in such art.

Other water insoluble copolymers which are considered herein to be suitable plasticizers for preparation of the pre-formed starch composite are, for example, ethylene/acrylic acid copolymers which contain from about 15 to about 25 weight units derived from the acrylic acid.

Additional water insoluble copolymers which are considered herein to be suitable for preparation of the pre-formed starch composite are, for example, copolymers of ethylene and polar monomers selected from methacrylic acid, crotonic acid and itaconic acid.

In practice, various diene-based elastomer compositions may be used for the reinforced coated cord reinforced rubber composition of this invention.

Such diene-based elastomers may be selected from, for example, polymers and copolymers of isoprene and 1,3-butadiene and copolymers of styrene or alpha methyl styrene and at least one of isoprene and 1,3-butadiene.

Representative examples of such elastomers are, for example, cis 1,4-polyisoprene (natural and synthetic), cis 1,4-polybutadiene, trans 1,4-polybutadiene, isoprene/butadiene copolymers, styrene/butadiene copolymers (solution and emulsion polymerization prepared) and high vinyl polybutadiene having a vinyl 1,2-content in a range of from 30 to 90 percent In practice, the rubber composition may contain a tin and/or silicon coupled, preferably tin coupled, diene-based elastomer prepared by organic solvent polymerization in the presence of a suitable tin-based catalyst complex of at least one of isoprene and 1,3-butadiene monomers or of styrene together with at least one of isoprene and 1,3-butadiene monomers. Said tin and/or silicon coupled elastomers may be selected from, for example, styrene/butadiene copolymers, isoprene/butadiene copolymers, styrene/isoprene copolymers and styrene/isoprene/butadiene terpolymers. The preparation of tin and silicon coupled elastomers via organic solvent polymerization is well known to those having skill in such art.

In practice, the rubber composition may contain a functionalized diene-based elastomer. For example, a functionalized elastomer may be provided as a diene-based elastomer as described above which contains one or more functional groups such as, for example, one or more hydroxyl groups, carboxyl groups, silanol groups, amine groups and epoxy groups, which are available to participate in reactions with, for example rubber reinforcing fillers such as, for example, carbon black (actually moieties such as for example minor amounts of carboxyl groups on the surface of carbon black), carbon black which contains domains of silica on its surface, amorphous silica, clay (particularly water swellable clay such as for example montmorillonite clay), and starch-based reinforcement. Such functionalized diene-based elastomers, and their preparation, are well known to those having skill in such art.

It is readily understood by those having skill in the art that the rubber compositions of the cord reinforced tire components would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black may comprise about 20 to 120 parts by weight per 100 parts by weight of diene rubber (phr), preferably 30 to 80 phr. Typical amounts of tackifier resins, if used, may comprise about 0.5 to about 10 phr, usually about 1 to about 5 phr. Typical amounts of processing aids may comprise 1 to 50 phr. Such processing aids may include aromatic, napthenic, and/or paraffinic processing oils. Silica, if used, may be used in an amount of about 5 to about 25 or from 5 to about 80, phr, often with a silica coupling agent. Representative silicas may be, for example, synthetic precipitated silicas. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of cord reinforced rubber compositions for various tire components wherein the selection of cords, cord treatment and various elastomers will depend somewhat upon the tire component contemplated whether it be a carcass ply, belt ply or other component.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2 phr. In another embodiment, combinations of two or more accelerators which the primary accelerator is generally used in the larger amounts, 0.5 to 2 phr, and a secondary accelerator which is generally used in amounts of 0.05 to 0.50 phr in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization of specified ingredients to enhance the aesthetic appearance of the visible surface of a tire.

Sometimes, the combination of zinc oxide, fatty acid, sulfur and accelerator(s) may be collectively referred to as curatives.

Sometimes a combination of antioxidants, antiozonants may be collectively referred to as antidegradants.

The tire can be built, shaped, molded and cured by various methods which will be readily apparent to those having skill in such art.

The prepared tire of this invention is conventionally shaped and cured by methods known to those having skill in such art.

The tire can be built, shaped, molded and cured by various methods which will be readily apparent to those having skill in such art.

The prepared tire of this invention is conventionally shaped and cured by methods known to those having skill in such art.

The following examples are present to illustrate the invention and are not intended to be limiting. The parts and percentages are by weight unless otherwise indicated.

EXAMPLE I

Preparation of Cord Coating Compositions

Samples of cord coating compositions (cord dips) were prepared and identified herein as Control Sample A and Samples B through D.

The coating composition of Control Sample A was comprised of a blend of styrene/butadiene latex and styrene/butadiene/vinyl pyridine latex composed of emulsified particles of styrene/butadiene elastomer and styrene/butadiene/vinyl pyridine elastomer together with and resorcinol/formaldehyde resin. In particular, the resin was prepared by an in-situ reaction of resorcinol and formaldehyde in the presence of the latex.

The coating compositions of Samples B through D were prepared in a manner similar to Control Sample A except that a starch/plasticizer composite was added to the composition after the formation of the resorcinol/formaldehyde resin in the associated latex.

The materials for Control Sample A and Samples B through D are shown in the following Table 1. The materials are reported in Table 1 in terms of weight percent of the material in the latex.

TABLE 1

| Material | Control Sample A | Sample B | Sample C | Sample D |
|---|---|---|---|---|
| Resorcinol/formaldehyde resin[1] | 3 | 3 | 3 | 3 |
| Latex blend[2] | 15 | 15 | 15 | 15 |
| Starch/plasticizer composite[3] | 0 | 1 | 2 | 3 |
| Water | 82 | 81 | 80 | 79 |

[1] Resorcinol/formaldehyde resin formed in situ within the latex blend (2) by addition of resorcinal and formaldehyde thereto.
[2] Blend of styrene/butadiene latex and vinyl-styrene/butadiene latex obtained as Baystal S-71 from Bayer and VP106S from Eliokem respectively, reported in Table 1 on a basis of dry weight thereof in a weight ratio of 50/50. The latices also contained appropriate emulsifiers (surfactive agents).
[3] Composite composed of about 60 weight percent starch and about 40 weight percent ethylene-vinyl-alcohol plasticizer obtained as Materbi 1128RR from Novamont SPA.

EXAMPLE II

Cords comprised of a plurality of Nylon 66 fibers were coated, respectively, with coating compositions Control Sample A and Samples B through D as reported in the following Table 2 by dipping the cords into the coating compositions and curing the coated cords at a temperature of about 235° C. for about 40 seconds.

The coated cords were tested for adhesion of the coating compositions to the cord with the adhesion of test samples B, C and D being comparable to Control Sample A.

This is considered herein to be significant because the addition of the starch/plasticizer composite to the Control Sample A did not significantly change the adhesion of the coating composition to the cord.

EXAMPLE III

Preparation of Cord Coating Compositions

Samples of cord coating compositions (cord dips) were prepared and identified herein as Control Sample E and Sample F The coating composition of Control Sample E was similar to Control Sample A of Example I except that a blocked isocyanate plus an epoxy plus carbon black was included in the formulation. As in Example I, the resorcinol/formaldehyde resin was prepared by an in-situ reaction of resorcinol and formaldehyde in the presence of the latex.

The coating composition of Sample F was prepared in a manner similar to Control Sample E except that a starch/plasticizer composite was added to the coating composition.

The materials of Control Sample F and Sample E are shown in Table 3. The materials are reported in Table 1 in terms of weight percent of the respective material in the latex.

TABLE 3

| Material | Control Sample E | Sample F |
|---|---|---|
| Resorcinol/formaldehyde resin plus blocked isocyanate[1] | 1.4 | 1.4 |
| Latex (same as for Example A)[2] | 8.1 | 8.1 |
| Epoxy[3] | 2.9 | 2.9 |
| Carbon black[4] | 1.6 | 0 |
| Starch/plasticizer composite[5] | 0 | 1.6 |
| Water | 86 | 86 |

[1] Blend of phenolic hindered diisocyanate as di-phenyl-methane diisocyanate and resorcinol/formaldehyde resin obtained as Cohedur E230 from the Bayer Company and Penacolite R-2170 from the Indspec company, respectively, in a weight ratio of said resin to said hindered diisocyanate of about 2.5/1.0
[2] Blend of styrene/butadiene latex and vinyl-styrene/butadiene latex obtained as Baystal S-71 from Bayer and VP106S from Eliokem, respectively, reported in Table 1 on a basis of dry weight thereof in a weight ratio of 50/50. The latices also contained appropriate emulsifiers (surfactive agents).
[3] Epoxy as ortho-cresol formaldehyde resin obtained as EPI-REZ 3530-W-68 from the Resolution Performance Products Company
[4] N115, an ASTM designation
[5] Composite composed of about 60 weight percent starch and about 40 weight percent Ethylene-Vinyl-Alcohol plasticizer obtained as Materbi 1128RR from Novamont SPA.

EXAMPLE IV

Cords comprised of a plurality of polyester fibers (obtained as 1×53 from the Honeywell company) were coated, respectively, with coating compositions Control Sample E and Sample F by dipping the cords into the coating compositions and drying the coated cords at a temperature of about 243° C. for about 60 seconds.

The coated cords were tested for adhesion of the coating compositions to the cord with the adhesion of test Sample F being comparable, and somewhat improved as compared to Control Sample E.

This is considered herein to be significant because the addition of the starch/plasticizer composite to the Control Sample E did not significantly, and actually somewhat improved, change the adhesion of the coating composition to the cord.

While certain representative embodiments and details have been shown for the purpose of illustrating the invention, it will be apparent to those skilled in this art that various changes and modifications may be made therein without departing from the spirit or scope of the invention.

What is claimed is:

1. A coated cord comprised of at least one yarn selected from at least one of nylon, aramid, polyester, carbon, steel wire, brass coated steel wire, rayon and glass fibers coated with a coating composition comprised of:
   (A) an aqueous dispersion comprised of
      (1) an aqueous latex of elastomer particles, and
      (2) a resorcinol/formaldehyde resin in a weight ratio of said resin to said elastomer particles in a range of from about 10/90 to about 70/30, or
   (B) an aqueous dispersion comprised of
      (1) phenolic hindered, diisocyanate comprising diphenylmethane diisocyanate blocked with a rescorcinol-formaldehyde precondensate, and
      (2) an ortho-cresol formaldehyde resin in a weight ratio of said resin to said phenolic hindered diisocyanate in a range of from about 5/1 to about 10/1, and
   (C) particulate water insoluble, pre-formed, starch composite as a composite of starch and water insoluble plasticizer therefor, wherein the weight ratio of starch to plasticizer is in a range of about 1.5/1 to about 9/1 and the weight ratio of starch to said elastomer particles in said latex and said resorcinol/formaldehyde resin is about 10/90 to about 25/75 and the weight ratio of starch to said phenolic hindered diisocyanate and associated resin is in a range of about 30/70 to about 55/45; wherein said starch is composed of amylose units and amylopectin units and has a softening point in a range of about 180° C. to about 220° C.; wherein said starch/plasticizer composite has a softening point in a range of about 110° C. to about 170° C. and where the plasticizer is a polymeric plasticizer having a softening point of less than 160° C.; wherein said softening points are determined according to ASTM No. D1228;

wherein said elastomer particles of said latex are comprised of at least one of vinylpyridine/diene terpolymers, selected from styrene/butadiene/vinylpyridine terpolymers and butadiene/vinylpyridine copolymers, natural cis 1,4-polyisoprene rubber, chloroprene rubber, acrylonitrile/butadiene copolymer rubber, cis 1,4-polybutadiene rubber, ethylene/propylene/diene terpolymer rubber and styrene/butadiene rubber (SBR), and their mixtures.

2. The coated cord of claim 1 wherein said coating composition is comprised of said aqueous latex of elastomer particles, resorcinol/formaldehyde resin and pre-formed composite of starch and plasticizer therefor, wherein said resin is formed in situ within said latex by reaction of rescorcinol and formaldehyde.

3. The coated cord of claim 1 wherein said elastomer particles of said coating composition are comprised of at least one of styrene/butadiene copolymer and styrene/butadiene/pyridine terpolymer.

4. The coated cord of claim 2 wherein said elastomer particles of said coating composition are comprised of at least one of styrene/butadiene copolymer and styrene/butadiene/pyridine terpolymer.

5. The coated cord of claim 1 wherein said coating composition is comprised of said aqueous latex of elastomer particles, said phenolic hindered diisocyanate, and said ortho-cresol formaldehyde resin in a weight ratio of said resin to said phenolic hindered diisocyanate in a range of from about 5/1 to about 10/1, and said pre-formed composite of starch and plasticizer.

6. The coated cord of claim 5 wherein said elastomer particles are comprised of at least one of styrene/butadiene copolymer and styrene/butadiene/pyridine terpolymer.

7. The coated cord of claim 6 wherein said coating composition is the product of:
(A) dissolving resorcinol in water in a suitable container to form an aqueous resorcinol solution
(B) adding an aqueous formaldehyde solution to said resorcinol solution to form a solution containing said resorcinol and formaldehyde of a weight ratio in a range of about 1.5/1 to about 2.5/1,
(C) adding a base selected from sodium hydroxide, ammonium hydroxide and/or potassium hydroxide slowly to said aqueous solution of resorcinol and formaldehyde to form an aqueous mixture thereof,
(D) adding said particulate pre-formed composite of starch and water insoluble plasticizer therefor to said mixture, and
(E) adding said aqueous latex of elastomer particles to said starch composite-containing mixture.

8. The coated cord of claim 1 wherein said coated cord is heat treated to a temperature in a range of from about 175° C. to about 250° C.

9. A cord reinforced diene-based rubber composition comprised of at least one diene-based elastomer and at least one of said coated cords of claim 8.

10. A cord reinforced diene-based rubber composition comprised of at least one diene-based elastomer and at least one of said coated cords of claim 2.

* * * * *